United States Patent [19]

Henne et al.

[11] Patent Number: 4,858,852

[45] Date of Patent: Aug. 22, 1989

[54] DIVERGENT TRAILING-EDGE AIRFOIL

[75] Inventors: Preston A. Henne, Irvine; Robert D. Gregg, III, Anaheim, both of Calif.

[73] Assignee: McDonnell Douglas Corporation, Long Beach, Calif.

[21] Appl. No.: 56,250

[22] Filed: Jun. 1, 1987

[51] Int. Cl.[4] .............................................. B64C 3/14
[52] U.S. Cl. .................................... 244/35 R; 244/198
[58] Field of Search ................... 244/35 R, 198, 200, 244/204

[56] References Cited

U.S. PATENT DOCUMENTS

| | | | |
|---|---|---|---|
| Re. 19,412 | 1/1935 | Zaparka | 244/12.1 |
| 3,952,971 | 4/1976 | Whitcomb | 244/35 R |
| 4,072,282 | 2/1978 | Fulker et al. | 244/35 R |
| 4,121,787 | 10/1978 | Wilby | 244/35 R |
| 4,311,289 | 1/1982 | Finch | 244/55 |
| 4,314,795 | 2/1982 | Dadone | 416/223 R |
| 4,387,869 | 6/1983 | Englar et al. | 244/207 |
| 4,413,796 | 11/1983 | Bosquet | 244/35 R |
| 4,455,003 | 6/1984 | Hilbig | 244/35 R |
| 4,457,480 | 7/1984 | Englar | 244/207 |
| 4,542,868 | 9/1985 | Boyd | 244/198 |

OTHER PUBLICATIONS

Pergamon Press, 1978, "The Aerodynamic Design of Aircraft", D. Kuchemann, FRS, pp. 225-226.
Journal of Aircrafts, vol. 15, No. 9, Sep. 1978, AIAA, "Design of Subsonic Airfoils for High Lift", Robert H. Liebeck, pp. 547-561.

Primary Examiner—Joseph F. Peters, Jr.
Assistant Examiner—Rodney Corl
Attorney, Agent, or Firm—Paul T. Loef; George W. Finch; John P. Scholl

[57] ABSTRACT

A special contour near the trailing edge of an airfoil which improves the airfoil effectiveness. The contour is a combination of a blunt airfoil base, a local region of high surface curvature, typically on the airfoil lower surface, and upper surface and lower surface trailing edge slopes that diverge from each other.

5 Claims, 7 Drawing Sheets

DIVERGENT TRAILING-EDGE AIRFOIL

STATEMENT OF GOVERNMENT INTEREST

The Government has rights in this invention pursuant to Contract NAS-11-295(B) thru Modification 6 awarded by the National Aeronautics and Space Administration.

BACKGROUND OF THE INVENTION

This invention relates to the field of advanced transonic airfoils for flight vehicles. More particularly, the invention relates to an airfoil trailing-edge design to improve airfoil effectiveness in terms of increased thickness, increased lift capability, and decreased drag.

The aerodynamic drag of modern transonic airfoil sections consists of two components. The two components are skin friction related drag and compressibility drag. At lower speeds (Mach numbers) the airfoil section drag consists only of the skin friction related drag. As the speed or Mach number is increased, shock waves appear on the airfoil surface. These shock waves cause increased drag and are the major portion of the drag referred to above as compressibility drag. Compressibility drag increases dramatically with increasing Mach number and strongly limits airfoil efficiency in terms of lift-to-drag ratio. For example, modern air transport wing designs are developed to delay the onset of this drag rise until the design cruise Mach number is reached. The aerodynamicist utilizes both wing sweep and airfoil section characteristics as the primary variables in achieving a sufficiently high drag rise Mach number while also attaining high lift and low drag.

Recent developments in airfoil section transonic efficiency have focused upon the so-called "Supercritical Airfoil" developed by R. T. Whitcomb (U.S. Pat. No. 3,952,971). This type of airfoil section makes use of relatively flat upper surface curvature and a high level of aft-camber to achieve high lift and low drag at high Mach numbers. However, detailed design studies utilizing such supercritical or aft-loaded airfoils have revealed several adverse characteristics. First, highly aft cambered airfoils tend to be thin in the region of the wing flap structure. This thinness causes structural design difficulties with the flap system. Second, adverse, viscous boundary layer effects have been found to be more significant for highly aft-loaded airfoils. A significant amount of the aft-camber is effectively lost due to viscous boundary layer decambering near the upper surface trailing edge and in the cove region of the lower surface. As a result of these adverse characteristics, the full theoretical benefit of the so-called "Supercritical Airfoil" is not obtained in practice.

It is recognized that prior efforts have been made to increase camber in airfoil design. All trailing edge devices such as flaps as taught by Zaparka in the 1935 U.S. Pat. Re. No. 19,412 and wedges as taught by Dadone in U.S. Pat. No. 4,314,795 issued in 1982 and wedges, again, as taught by Boyd in the 1985 U.S. Pat. No. 4,542,868 have been used to change airfoil section lift. However, all of these devices produce surface discontinuities which produce earlier boundary layer separation, drag penalties and the loss in camber effectiveness resulting from these discontinuities.

It is an object of this invention to produce increased camber effectiveness in airfoil design while avoiding the surface discontinuities associated with the prior designs.

It is a further object of this invention to provide for a thicker airfoil section in the region where the flap spar is normally located which supports the trailing edge flap.

SUMMARY OF THE INVENTION

In summary, the present invention avoids the surface discontinuities associated with the prior art devices by providing an airfoil trailing edge design which features a blunt base, a region of high local concave curvature, typically on the lower or higher pressure surface at or near the trailing edge, and upper surface and lower surface slopes at the airfoil trailing edge that diverge from each other. Typically, a vertical or near vertical base having a height in the range of 0.2% to 1.0% of the airfoil chord is used. The high local curvature predominately occurs within the last 2% to 3% of the airfoil chord. The included angle between the upper surface and lower surface is typically between 10° and 45°.

The increased camber effectiveness is achieved through several means. First, this trailing edge design alters the normal matched upper surface and lower surface pressures, commonly referred to as the Kutta Condition, for airfoil section lift determination. By introducing high curvature near the trailing edge on one airfoil surface, substantial airfoil chordwise loading can be maintained all the way to the trailing edge, hence, improving the airfoil lift capability. The Kutta Condition is modified in the trailing edge region of the airfoil flow field. Second, by having the divergent surfaces, the local pressure on the airfoil base is lowered and the suction surface (typically the upper surface) boundary layer growth is reduced. This reduction in the upper surface boundary layer growth increases the camber effectiveness of the airfoil. Third, by introducing high concave curvature on the pressure surface (typically the lower surface) of the airfoil, the lower surface pressure distribution can be controlled so that the lower surface boundary layer growth causes little or no loss in camber effectiveness. In some cases, a lower surface boundary layer growth can be achieved which actually increases the effective camber. By carefully contouring this region of the airfoil, the boundary layer growth is well controlled. Boundary layer separation on the lower surface and the resulting drag penalties are avoided. The lower surface flow is diffused as much as or more than the upper surface flow, and, consequently, the aerodynamic work accomplished by the airfoil surfaces is increased relative to the prior art trailing edge design.

Special contouring and final divergence of the trailing edge produces increased camber effectiveness in the airfoil which can be utilized to reduce compressibility drag at a given lift or increase lift at a given angle of attack, or increase section thickness at given lift and drag, or increase drag divergence Mach number at given lift and drag, or to produce some combination of these preceding improvements.

BRIEF DESCRIPTION OF THE DRAWINGS

With reference to the drawings, wherein like numbers designate like portions of the invention.

BEST MODE FOR CARRYING OUT THE INVENTION

Figure 13:
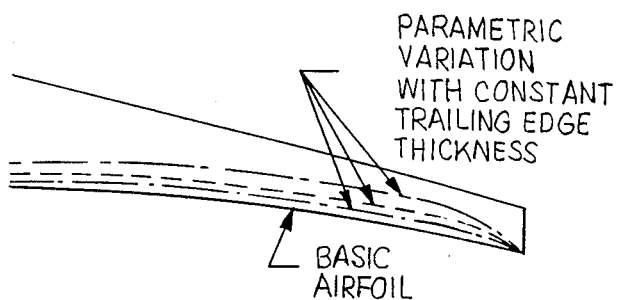

The basic approach to incorporating the divergent trailing edge, as taught in this invention, in an airfoil is to start with an existing airfoil having a conventional trailing edge or to design an airfoil to perform the specific task at hand without geometric limitations and using the conventional trailing edge design. One might refer to this as the baseline airfoil. The next step is to modify the trailing edge of the baseline airfoil by providing a near vertical blunt base whose height is in the range of 0.2% to 1.0% of the airfoil chord and by providing a region of high local concave curvature in the last 3% of the airfoil chord on the lower surface. The exact shape of the concave curvature is determined by producing a series of parametric variations increasing the concavity while maintaining the trailing edge thickness as shown in FIG. 13. Increasing the concavity also increases the divergence of the lower surface with respect to the upper surface which may range from 10° to 45°. These alternate lower surfaces in combination with the rest of the airfoil must be analyzed for performance, as in any other airfoil, until the optimum surface curvature is determined for the design conditions. The airfoil must is then wind tunnel tested to confirm the calculations.

Figure 1:
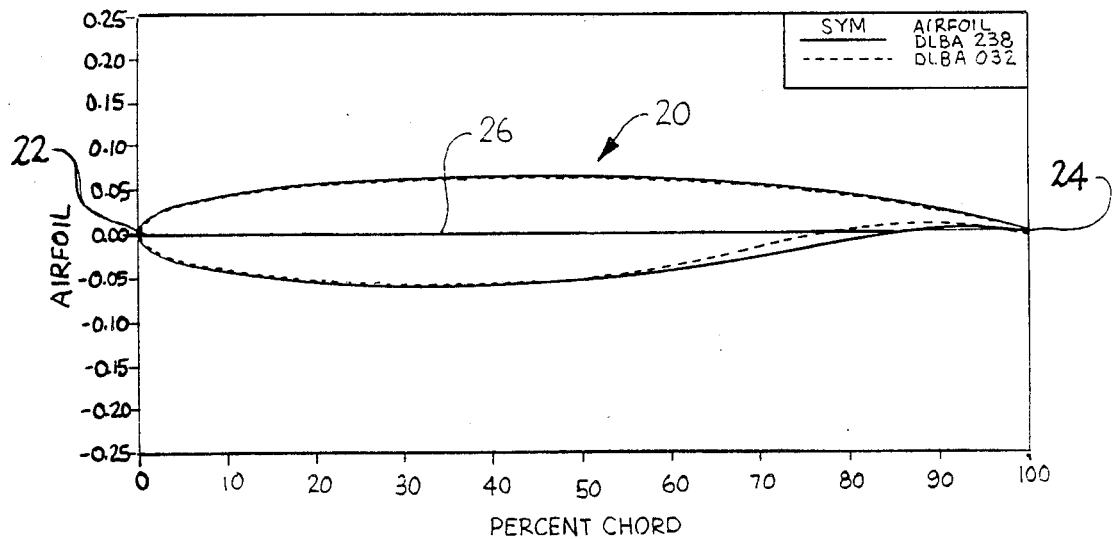
FIG. 1 is a pair of cross-sectional views of a baseline supercritical airfoil and the same airfoil modified to the divergent trailing edge of this invention.

FIG. 1 illustrates a sectional view of a typical transport airfoil designed in accordance with the teachings of Whitcomb. The baseline airfoil is shown in dotted lines, designated DLBA 032, while the airfoil using the divergent trailing edge of this invention is shown in solid lines and designated DLBA 238. The DLBA 238 airfoil was computationally designed to have the transonic aerodynamic lift and drag characteristics as the reference airfoil DLBA 032. However, the use of the divergent trailing edge (DTE) invention allowed for geometric modification of the airfoil so as to provide a much thicker airfoil in the region of the wing flap structure. This increased thickness means a substantially lighter flap structure since the depth of the airfoil at 80% chord, which is the flap spar region, is increased by 30%.

Figure 2:
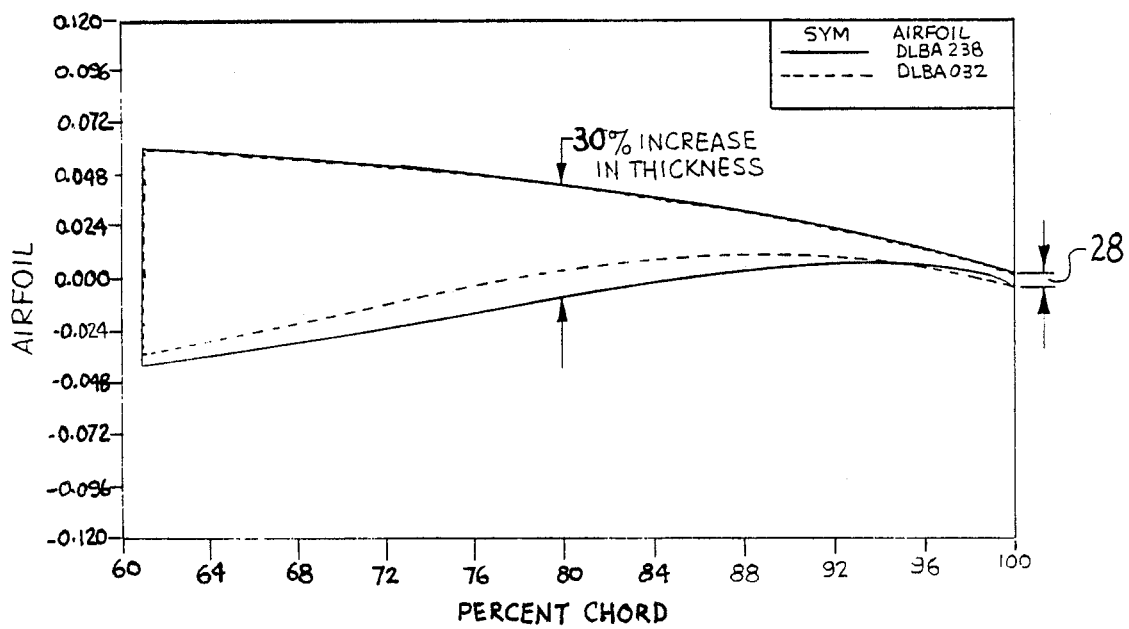
FIGS. 2 and 3 are enlarged views of the trailing edge portions of the airfoils shown in FIG. 1.
Figure 3:
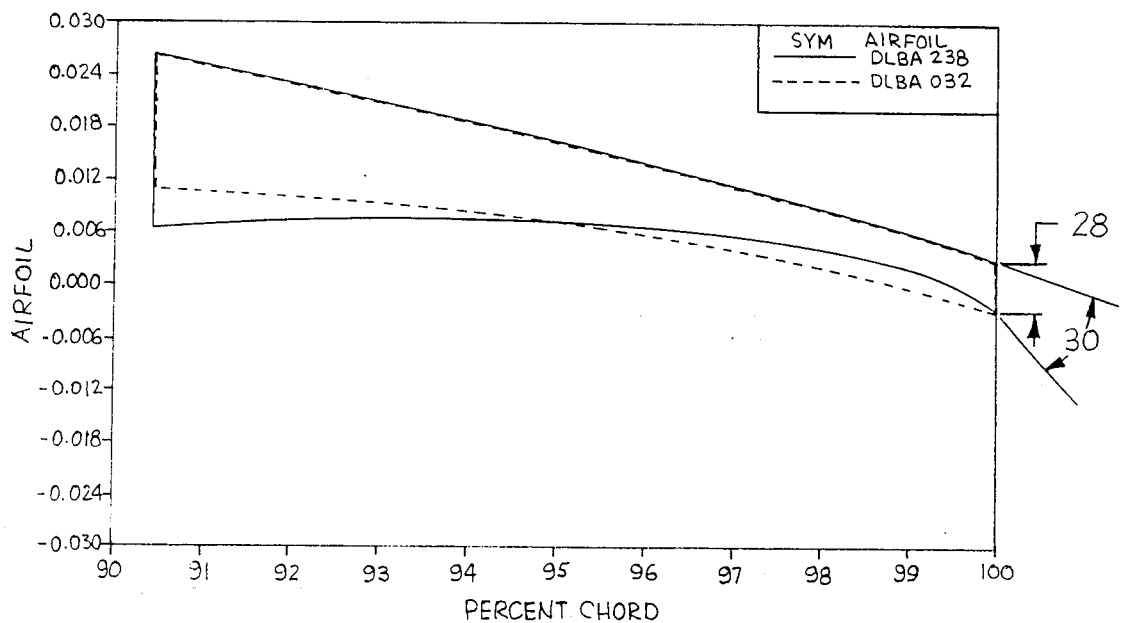

In all airfoils, whether the baseline airfoil or the divergent trailing edge airfoil, the airfoil is generally designated as 20, with a leading edge 22 and a trailing edge 24 with a chord 26 connecting the two. The divergent trailing edge is best shown in FIGS. 2 and 3 in the solid lines. A blunt, near vertical base is indicated by the numeral 28 and the angle between the airfoil upper and lower surfaces at the trailing edge is identified as 30.

Figure 4:
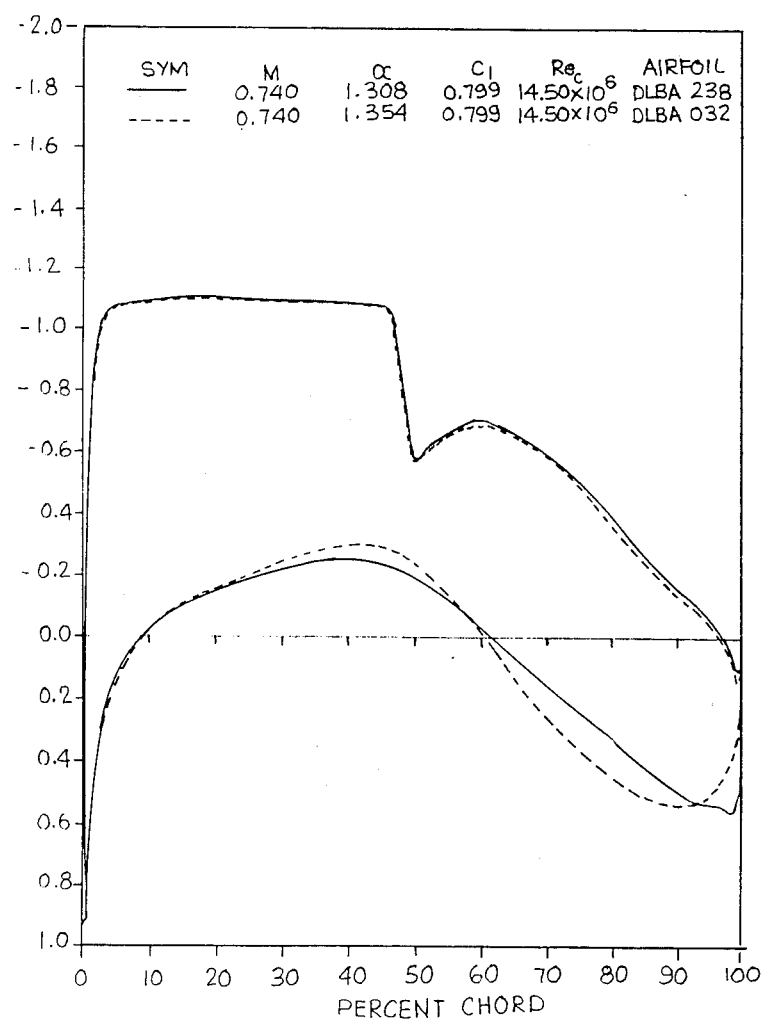
FIG. 4 is a two-dimensional chordwise pressure distribution comparison of the two airfoils shown in FIG. 1.

A design point pressure distribution for the baseline DLBA 032 (dotted lined) airfoil and the modified airfoil incorporating the divergent trailing edge DLBA 238 airfoil (solid line) are shown in FIG. 4. Three characteristics are noted. First, by design, the upper surface shock strength is the same for the two airfoils. Second, substantial changes in the lower surface pressure distribution have been made to introduce the increased airfoil thickness in the flap structure area. These changes include the effects of the DTE invention in controlling the pressure distribution. Adverse pressure gradients are reduced and lift loading is maintained essentially to the trailing edge. Third, the effect of the DTE invention is also indicated by reduced adverse pressure gradients on the airfoil upper surface near the trailing edge.

Figure 5:
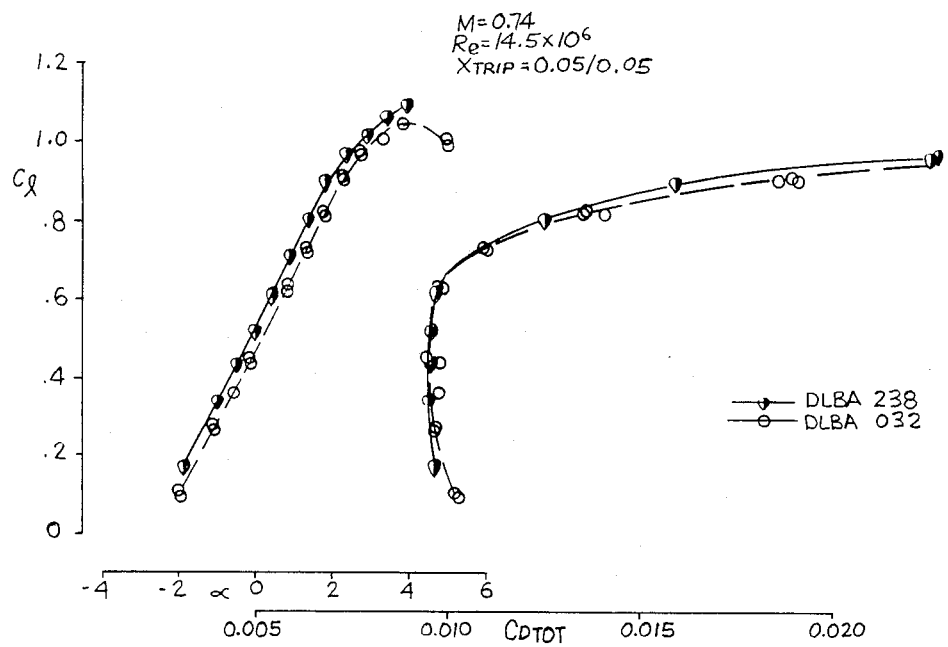
FIG. 5 is wind tunnel test results from the two airfoils of FIG. 1 showing lift co-efficient versus angle of attack and lift co-efficient versus drag co-efficient at the design free stream Mach number noted.

Wind tunnel test results for these two airfoils are illustrated in FIG. 5. Lift co-efficient versus angle of attack and lift co-efficient versus drag co-efficient are shown at the design freestream Mach number in this figure. At a given angle of attack, the lift of the DLBA 238 airfoil (DTE trailing edge) is slightly higher. The divergent trailing edge airfoil also shows higher maximum lift. At any given lift co-efficient, the drag co-efficient of the DTE airfoil is equal to or less than that of the reference or baseline airfoil. Hence, geometric modification of the airfoil to provide greater depth or thickness at the flap spar (80% chord) were incorporated by adding the divergent trailing edge while still providing a slight aerodynamic improvement.

Figure 6:
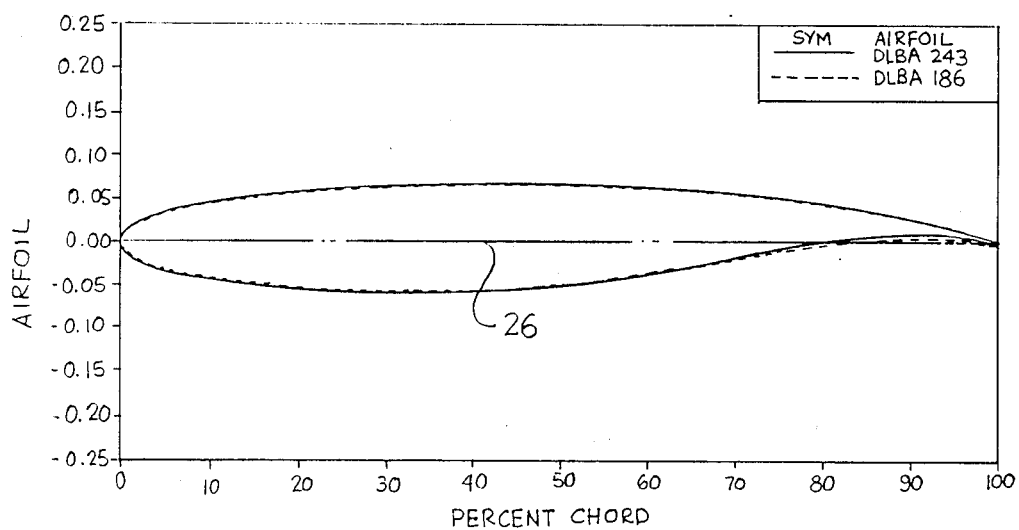
FIG. 6 is another pair of cross-sectional views comparing a baseline airfoil with the same airfoil incorporating the divergent trailing edge of this invention except in this application the invention was used to improve the airfoil section aerodynamic performance without adversely affecting geometric properties.
Figure 7:
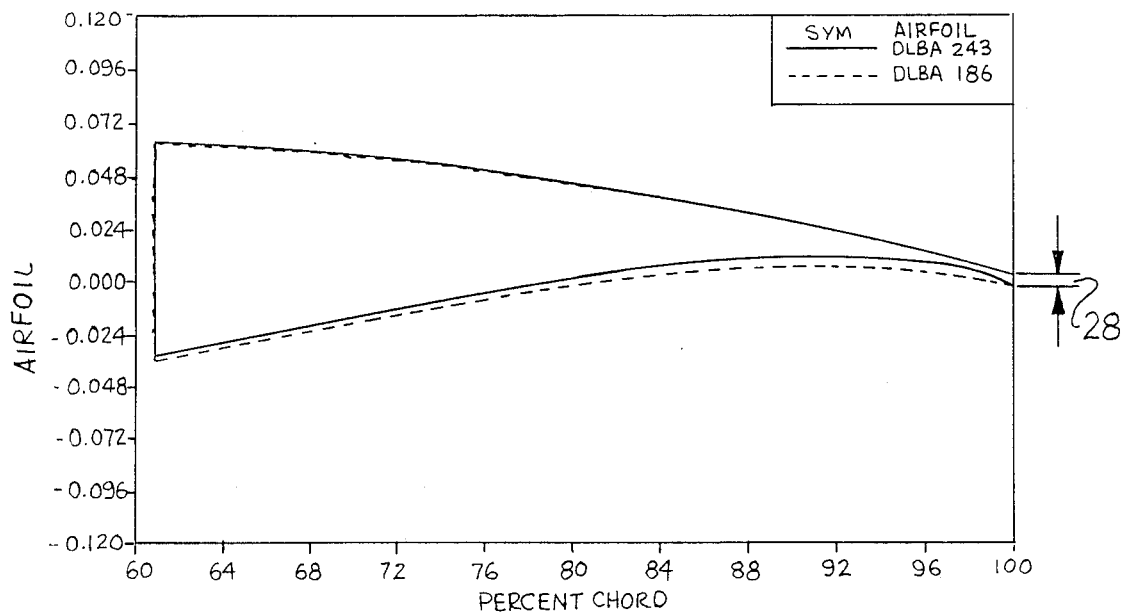
FIGS. 7 and 8 are enlarged views of the trailing edge portion of the airfoils shown in FIG. 6.
Figure 8:
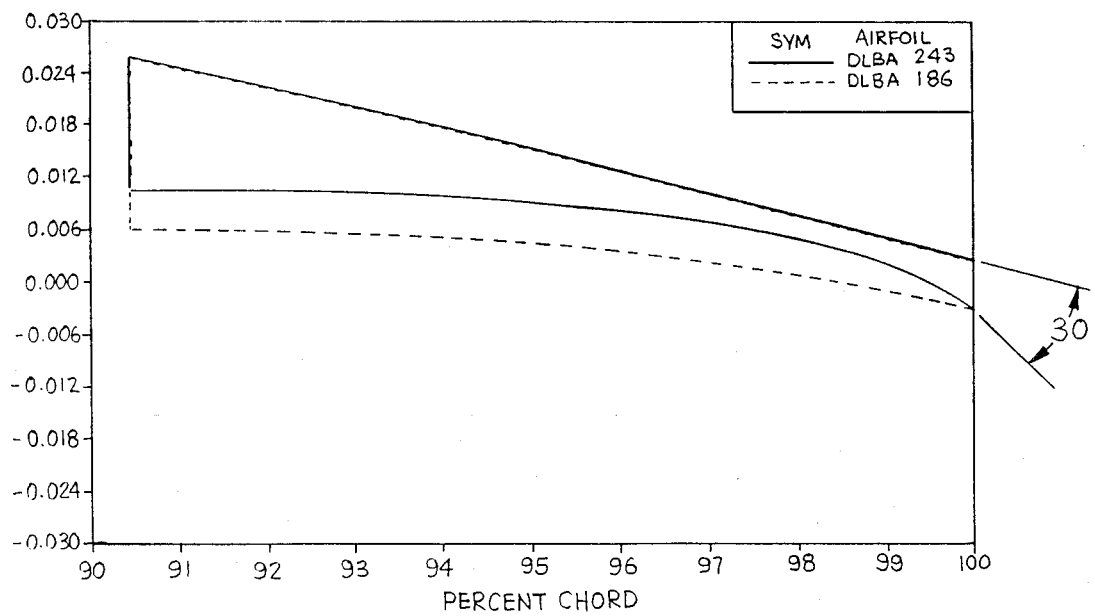

Another two airfoils are compared in FIGS. 6–8 where the divergent trailing edge of this invention was used to improve the airfoil section aerodynamic performance without adversely affecting the geometric properties. The reference or baseline airfoil is designated DLBA 186 while the airfoil using the DTE is designated DLBA 243. The DTE invention was incorporated into the DLBA 243 airfoil by recontouring the airfoil lower surface near the trailing edge of the baseline airfoil. Design constraints associated with the minimum structural thickness were maintained.

Figure 9:
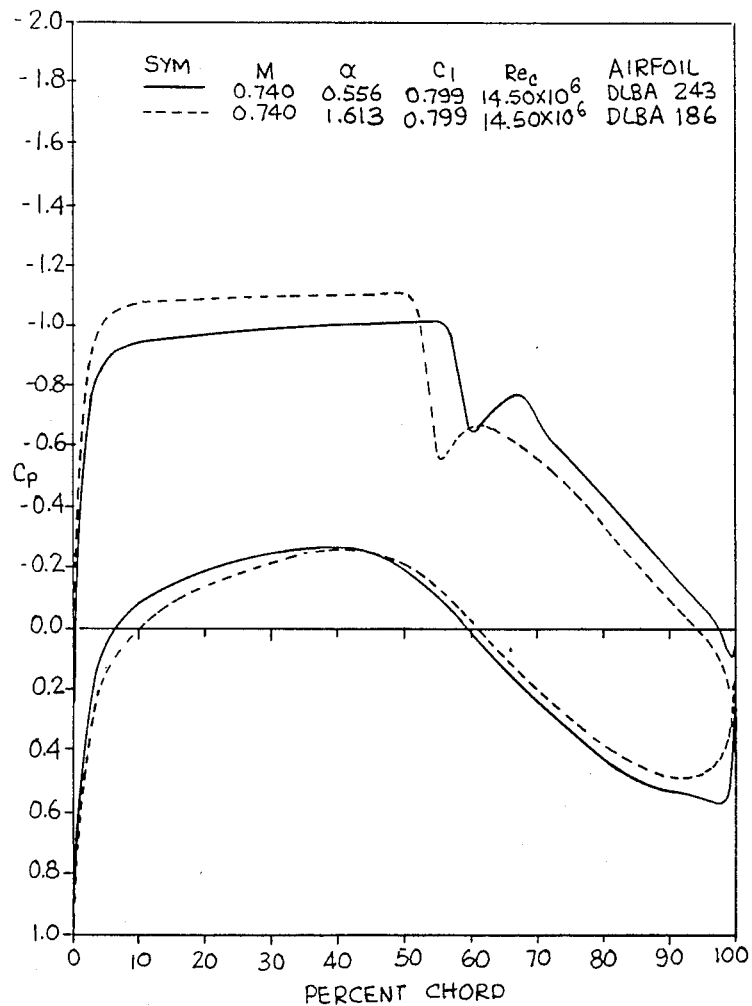
FIG. 9 is a two dimensional chordwise pressure distribution comparison of the airfoils shown in FIG. 6.

The design point pressure distributions for the baselines DLBA 186 airfoil and the DLBA 243 airfoil are compared in FIG. 9. In this example the DLBA 243, utilizing the DTE invention, produces a much weaker upper surface shock wave while producing the same lift as the original airfoil. This reduction in shock wave strength leads to a significant improvement in compressibility drag characteristics. It is also to be noted that the lift loading is carried essentially to the trailing edge of the divergent trailing edge contour. The resulting additional lift reflects the effectiveness of the DTE. Finally, the upper surface pressure near the trailing edge is substantially reduced. This reduction continues all the way to the trailing edge and represents a reduction in adverse pressure gradient for the upper surface boundary layer. This reduced gradient leads to more lift capability, increased buffet lift co-efficients, and increased maximum lift levels.

Figure 10:
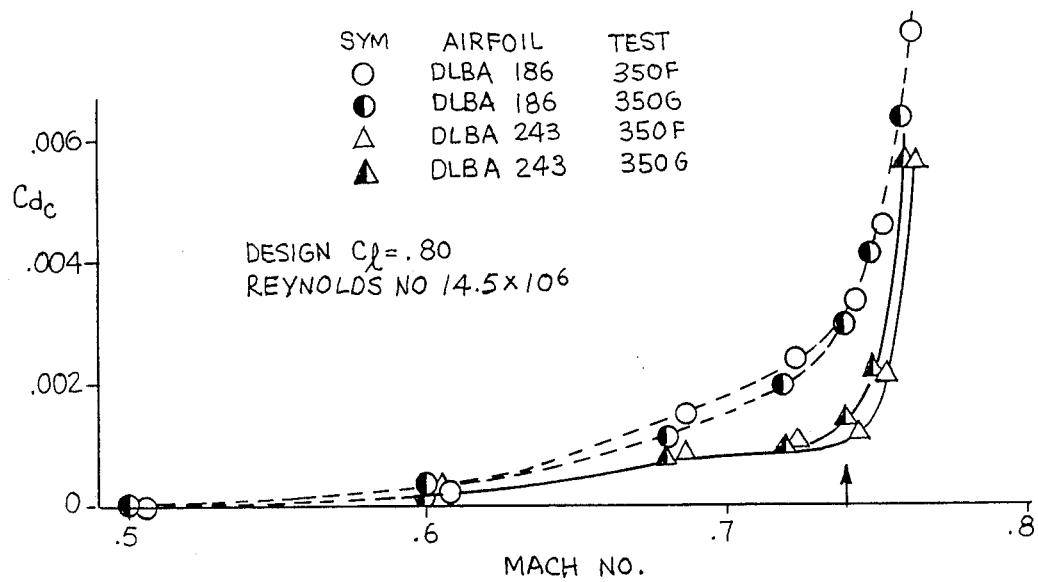
FIG. 10 is a comparison of the compressibility drag of the airfoils of FIG. 6.

The wind tunnel measured drag characteristics for these two airfoils, DLBA 186 and 243, are compared in FIG. 10. The circles indicate the measured drag rise of the reference airfoil DLBA 186. The triangles indicate the measured drag rise of the DTE airfoil DLBA 243. The reduced shock strength of the DLBA 243 section leads to a significant drag reduction as shown in the figure. This drag reduction represents 3 to 4% of aircraft drag when such a section is utilized in a three-dimensional wing design.

Figure 11:
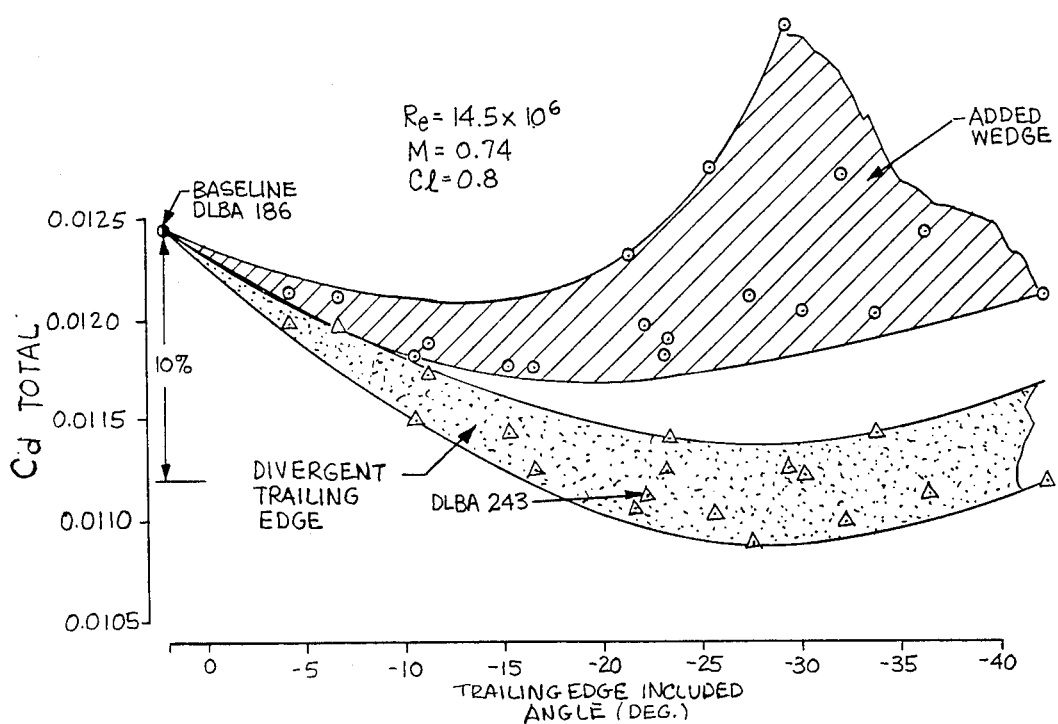
FIG. 11 compares the calculated airfoil drag co-efficient of the divergent trailing edge profiles with the added wedge of the prior art.
Figure 12:
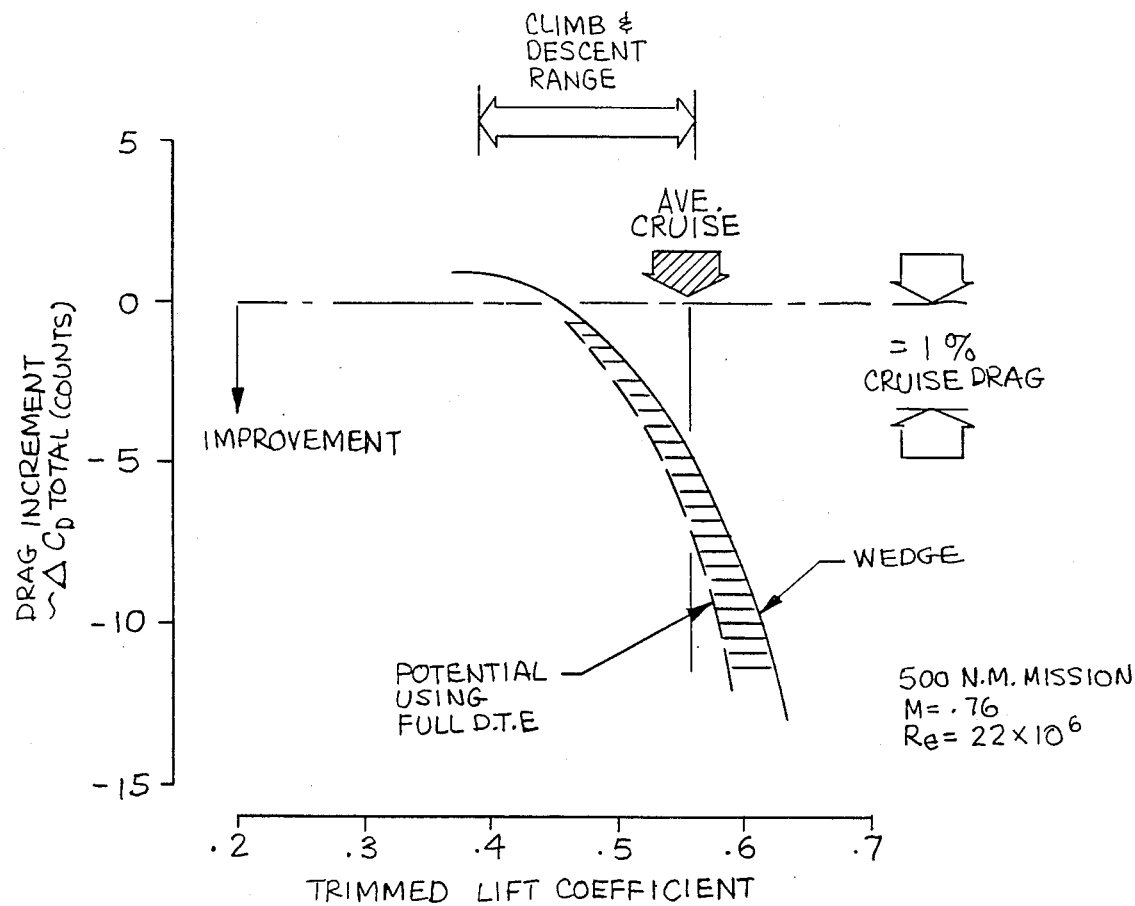
FIG. 12 is the effect on total airplane drag in counts, of an airfoil with the divergent trailing edges compared to the trailing edge wedge of the prior art; and, FIG. 13 shows the iterative process to establish the concave curvature of the lower airfoil surface.

FIG. 11 compares the calculated airfoil drag co-efficient for the divergent trailing edge profiles of this invention to the added wedge as taught by Dadone and Boyd of the prior art and shows a drag reduction of approximately 11% 2-D (which corresponds to 3-4% 3-D) using divergent trailing edge angles. FIG. 12 also compares the wedge of the prior art with the divergent trailing edge of this invention and shows a total drag reduction at cruise from 3 to 4 counts.

It is to be understood that the particular configurations shown for the divergent trailing edge are not intended to be limiting, and that modifications could be made within the teachings contained herein, without departing from the broader teachings of the present invention.

What is claimed is:

1. An improved transonic airfoil, having a chord, comprising:
    a blunt trailing-edge base;
    a high pressure surface connected to said blunt trailing-edge base by an immediate region of high local concentrated concave curvature;
    a low pressure surface, opposite said high pressure surface, and connected to said blunt trailing-edge base;
    the trailing portions of said high pressure and low pressure surfaces having slopes forming an included trailing-edge angle which diverges; and
    a leading edge connecting said high pressure and low pressure surfaces opposite said blunt trailing-edge base.

2. The improved airfoil of claim 1 wherein said slopes of said trailing portions of said high pressure and low pressure surfaces diverge from each other by an included angle between 10° and 45°.

3. The improved airfoil of claim 1 wherein said blunt trailing edge base is near vertical with respect to said chord.

4. The improved airfoil of claim 3 wherein said near vertical base has a height between 0.2% and 1.0% of said airfoil chord.

5. The improved airfoil of claim 1 wherein said high pressure surface region of high local concave curvature occurs within the last 5% of said airfoil chord.

* * * * *